(12) United States Patent
Herzig

(10) Patent No.: US 6,829,826 B2
(45) Date of Patent: Dec. 14, 2004

(54) METHOD OF MAKING A CROSS MEMBER OF A TWIST-BEAM AXLE FOR A MOTOR VEHICLE

(75) Inventor: Georg Herzig, Salzkotten (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 10/307,236

(22) Filed: Nov. 29, 2002

(65) Prior Publication Data

US 2003/0122344 A1 Jul. 3, 2003

(30) Foreign Application Priority Data

Dec. 8, 2001 (DE) .......................................... 101 60 352

(51) Int. Cl.⁷ .......................... B21D 53/88; B60G 11/20
(52) U.S. Cl. ...................... 29/897.2; 29/33 D; 29/33 T; 29/33 Q; 280/124.16; 228/146
(58) Field of Search .............................. 29/897.2, 33 D, 29/33 T, 33 Q; 280/124.166, 124.167; 228/146, 155; 72/177, 181

(56) References Cited

U.S. PATENT DOCUMENTS 4,905,885 A * 3/1990 Hellman, Sr. ................ 228/144
5,934,544 A * 8/1999 Lee et al. .................... 228/146

FOREIGN PATENT DOCUMENTS

EP          0681932 A2 * 12/1994
EP          1036679 A2 *  9/2000
EP          0992375 A2 * 12/2000

* cited by examiner

Primary Examiner—Marc Jimenez
(74) Attorney, Agent, or Firm—Henry M. Feiereisen

(57) ABSTRACT

In a method of making a cross member for a twist-beam axle of a motor vehicle, a band-shaped metal blank is shaped in a profiling unit in a continuous operation to a V-shaped or U-shaped double-walled hollow section having an outer wall and an inner wall, such that the outer wall of the hollow section extends, at least in an apex area thereof, at a distance to the inner wall of the hollow section, and that confronting longitudinal edges of the hollow section extend in the apex area of the outer wall. The confronting longitudinal edges of the hollow section are then joined by a longitudinal weld seam which is then smoothed. Subsequently the welded hollow section is cut to size to form a cross member.

6 Claims, 1 Drawing Sheet

METHOD OF MAKING A CROSS MEMBER OF A TWIST-BEAM AXLE FOR A MOTOR VEHICLE

CROSS-REFERENCES TO RELATED APPLICATIONS

This application claims the priority of German Patent Application, Ser. No. 101 60 352.5, filed Dec. 8, 2001, pursuant to 35 U.S.C. 119(a)–(d), the disclosure of which is incorporated herein by reference.

BACKGROUND OF THE INVENTION

The present invention relates, in general, to a cross member, and to a method of making a cross member of a twist-beam axle for a motor vehicle.

A twist-beam axle generally includes a rigid and torsionally flexible cross member which has a longitudinal control arm at each end. The longitudinal control arms support on one end a wheel carrier and are attached at their other end to the vehicle body.

Various approaches have been proposed to make the cross member rigid, on one hand, and sufficiently torsionally flexible, on the other hand. German publication no. DE 44 16 725 A1 discloses a cross member which is made over its entire length of a tubular profile which has a torsion-resistant cross section on both ends and in a central area a torsionally flexible U, V, L, X or similar cross section with at least one double-walled profiled leg. French Pat. No. FR 2,654,987 A1 describes a twist-beam axle having a V-shaped cross member which is welded to the longitudinal control arms via U-shaped transition pieces. German Pat. No. DE 27 40 948 A1 describes a twist-beam axle having a cross member composed of two superimposed shells in contact with one another and welded together. German Pat. No. DE 198 46 399 A1 describes a twist-beam rear axle having a cross member in which a stabilizer in the form of a metal sheet insert is arranged so as to ensure a certain torsional stiffness of the cross member.

However, for a number of reasons, the various proposals are endowed with drawbacks and shortcomings relating for example to manufacturing techniques or to the effect that is hoped to be obtained but may not always be realized.

It would therefore be desirable and advantageous to provide an improved method of making a cross member for a twist-beam axle, which obviates prior art shortcomings and which can be made in an easy and cost-efficient manner while yet being reliable in operation

SUMMARY OF THE INVENTION

According to one aspect of the present invention, a method of making a cross member for a twist-beam axle of a motor vehicle, includes the steps of shaping a band-shaped metal blank in a profiling unit in a continuous operation to a V-shaped or U-shaped double-walled hollow section with an outer wall and an inner wall, such that the outer wall of the hollow section extends, at least in an apex area thereof, at a distance to the inner wall of the hollow section, and that confronting longitudinal edges of the hollow section extend in the apex area of the outer wall, joining the confronting longitudinal edges of the hollow section by a longitudinal weld seam, smoothing the longitudinal seam of the welded hollow section, and cutting the welded hollow section to size to form a cross member.

A method according to the present invention for making a cross member of a twist-beam axle is economical and cost-efficient as far as production technique is concerned, and is applicable for making a cross member of steel sheet as well as aluminum sheet or other suitable metallic materials. The cross member made in accordance with the present invention is torsionally flexible and light-weight, while still enhancing the vehicle safety, running behavior and comfort of the motor vehicle. As a consequence of the hollow double section, the material consumption and thus the overall weight is reduced.

According to another feature of the present invention, the wall thickness of the metal blank can be best suited to the desired roll stiffness of a twist-beam axle.

The metal blank may be drawn from a coil for supply to the profiling unit, or may supplied to the profiling unit in the form of a flat plate.

According to another feature of the present invention, the welding operation of the hollow section is implemented fully automatically as is the after-treatment of the longitudinal weld seam, in a line without in-between handling of the involved components.

Suitably, the distance between the outer wall and the inner wall in the apex area is a multiple of a wall thickness of the metal blank. In practice, the distance between the outer wall and the inner wall should be at least 10 mm. This measure benefits the manufacture because welding of the longitudinal seam of the hollow section can then easily be automated. Also, the area enclosed by the hollow section can be best suited to vehicle-specific requirements. In this way, roll stiffness and torsional stiffness of the cross member can be adjusted. The roll stiffness can hereby be determined at a measure typical for the motor vehicle, without increase to the weight of the twist-beam axle.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
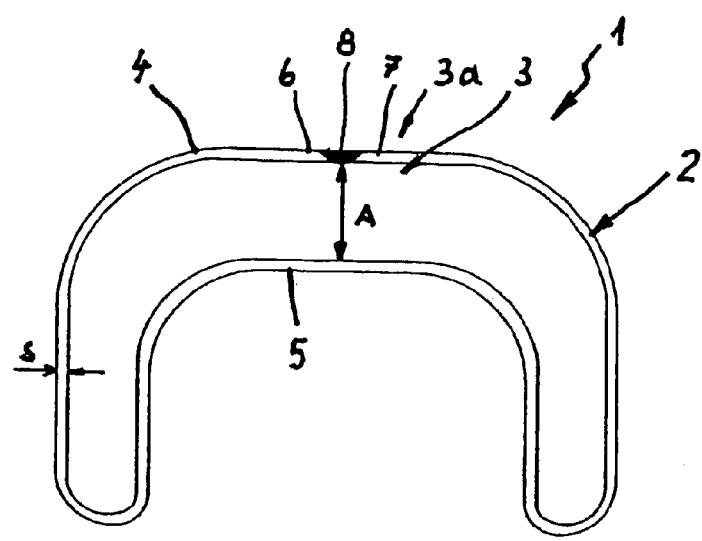
FIG. 1 shows a vertical section of a cross member according to the present invention.

The depicted embodiment is to be understood as illustrative of the invention and not as limiting in any way.

Turning now to FIG. 1, there is shown a vertical section of a cross member according to the present invention, generally designated by reference numeral 1 and used for a twist-beam axle of a motor vehicle. The cross member 1 has a double-walled U-shaped cross section and may be made from a metal blank of steel sheet or lightweight metal sheet, such as aluminum. Although not shown in detail, the cross member 1 may also have a V-shaped cross section.

Manufacture of the cross member 1 is realized by shaping a band-shaped metal blank in a profiling unit in a continuous operation to a V-shaped or U-shaped double-walled hollow section, generally designated by reference numeral 2, such that an outer wall 4 of the hollow section 2 extends, at least in an apex area 3, at a distance A to an inner wall 5 of the hollow section 2. Suitably, the distance A is a multiple of the wall thickness s of the hollow section 2. Currently preferred is a distance A of at least 10 mm.

As shown in FIG. 1, the confronting longitudinal edges 6, 7 of the hollow section 2 extend in the apex area 3a of the outer wall 4. Subsequently, the thus-shaped hollow section 2 is joined along the longitudinal edges 6, 7 by a longitudinal weld seam 8 which is then smoothed. The welded hollow section 2, still present in the form of a strand, may then be subjected to further surface treatments, if need be, before being cut to size to provide the respective cross members 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of making a cross member for a twist-beam axle of a motor vehicle, comprising the steps of:

shaping a band-shaped metal blank in a profiling unit in a continuous operation to a V-shaped or U-shaped double-walled hollow section having an outer wall and an inner wall, such that the outer wall of the hollow section extends, at least in an apex area thereof, at a distance to the inner wall of the hollow section, and that confronting longitudinal edges of the hollow section extend in the apex area of the outer wall;

joining the confronting longitudinal edges of the hollow section by a longitudinal weld seam;

smoothing the longitudinal seam of the welded hollow section;

and cutting the welded hollow section to size to form a cross member.

2. The method of claim 1, wherein the distance between the outer wall and the inner wall in the apex area is a multiple of a wall thickness of the metal blank.

3. The method of claim 2, wherein the distance between the outer wall and the inner wall is at least 10 mm.

4. The method of claim 1, and further comprising the step of drawing the metal blank from a coil for supply to the profiling unit.

5. The method of claim 1, an further comprising the step of supplying the metal blank in the form of a flat plate of the profiling unit.

6. The method of claim 1, wherein the joining step of the hollow section and the smoothing step of the longitudinal weld seam are fully automated in immediate succession.

* * * * *